Jan. 27, 1942.  A. E. JUVE  2,271,125
OFFSET PRINTING BLANKET
Filed Aug. 3, 1940
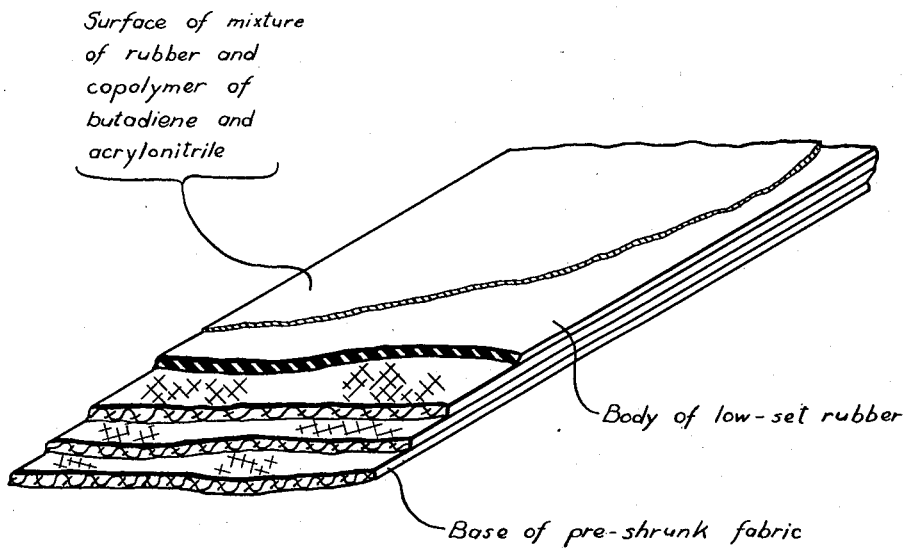
Surface of mixture of rubber and copolymer of butadiene and acrylonitrile
Body of low-set rubber
Base of pre-shrunk fabric
Inventor
Arthur E. Juve
By Willis F. Avery
Atty.

Patented Jan. 27, 1942

2,271,125

UNITED STATES PATENT OFFICE 2,271,125

OFFSET PRINTING BLANKET

Arthur E. Juve, Akron, Ohio, assignor to The B. F. Goodrich Company, New York, N. Y., a corporation of New York Application August 3, 1940, Serial No. 351,175

4 Claims. (Cl. 154—54.5)

This invention relates to offset printing blankets, and has as its chief object to provide offset printing blankets which are resistant to the action of printing inks, yet possess the desirable mechanical characteristics of offset printing blankets made of soft vulcanized natural rubber.

It is well known that many printing inks have a deleterious effect on natural rubber. When natural rubber is employed to make offset printing blankets, the surface soon becomes swelled under the action of the ink and also becomes tender which allows the repeated impacts on the blanket to form permanent depressions. These undesirable embossings and engraving effects soon render the blanket useless for first-class printing.

It has been proposed to make offset printing blankets out of various types of synthetic rubber which are more resistant to the action of printing inks than is natural rubber. It has been found, however, that many types of oil-resisting synthetic rubber are not readily wet by the printing inks. Instead of spreading over the synthetic surfaces in a thin uniform film, the printing inks have a tendency to form in small droplets.

I have now discovered a new structure for offset printing blankets which avoids the difficulties possessed by the structures of the prior art. Broadly, this new offset blanket comprises a pre-shrunk fabric base, a layer of low-set rubber forming the main body of the blanket, and a surface layer of a mixture of rubber and a copolymer of butadiene and acrylonitrile, as is shown in the accompanying drawing.

The fabric for the base is of the usual pre-shrunk type which forms a substantially non-deformable underlayer on which to build the stretchable surface. Although only one ply of fabric need be employed, it is preferable to employ two or three plies of pre-shrunk fabric as the base.

The next layer, which ordinarily constitutes the major portion of the blanket, is a low-set composition made of soft, vulcanized natural rubber, the term "soft" being employed to differentiate the composition employed from hard rubber, and not to indicate that the compositions are any softer than ordinary vulcanizates. Compositions which may be regarded as having a low set within the meaning of the term as herein employed exhibit a set of not more than about 10% when tested for compression set by the constant load method, which is described as method A of "Tentative methods of tests for compression set of vulcanized rubber," A. S. T. M. designation D395–37T. To obtain such low-set rubber compositions, substantial proportions, such as from 20–50 or more parts by weight per 100 parts of rubber, of fillers, especially reinforcing pigments such as carbon black, blanc fixe, fine clay, reinforcing calcium carbonate, etc., should be incorporated in the composition. It is also conducive to low-set vulcanizates to use relatively high proportions of sulphur, such as 3 or more parts per 100 parts of rubber, and to use an active accelerator so that a rather rapid cure will be obtained. These principles are well understood by those skilled in the art of compounding rubber, and these or any other methods of obtaining a low-set rubber body may be employed.

The surface of the offset printing blanket is composed of a thin layer of a vulcanized mixture of rubber and a copolymer of butadiene and acrylonitrile adhered to the low-set rubber body. Copolymers of butadiene and acrylonitrile are known synthetic rubbers which may be prepared by copolymerizing butadiene and acrylonitrile in a large range of proportions, the most useful copolymers being formed from mixtures ranging in composition from about 80 parts of butadiene and 20 parts of acrylonitrile to equal parts of butadiene and acrylonitrile, the amounts of ingredients throughout the specifications and claims being measured by weight. Specific preferred copolymers within this range include those formed by copolymerizing mixtures of about 75 parts of butadiene and 25 parts of acrylonitrile, 65 parts of butadiene and 35 parts of acrylonitrile, and 55 parts of butadiene and 45 parts of acrylonitrile.

The proportions in which the rubber and copolymer are combined to form a suitable material for making offset printing blankets depends upon several factors including the particular copolymer employed and the nature of the printing inks. In general, it may be stated that the higher the proportions of acrylonitrile present in the mixture from which the copolymer is prepared, the smaller will be the proportion of copolymer employed with the rubber. For many ordinary printing inks, mixtures containing between 20 and 30 parts of rubber and between 80 and 70 parts of a copolymer of a mixture of 75 parts of butadiene and 25 parts of acrylonitrile have proven highly satisfactory. Where even greater resistance to swelling is required, mixtures containing as high as 90 parts of the copolymer with 10 parts of rubber may be employed, but as the proportion of copolymer is further increased, the advantage of increased oil-resistance is offset by the impairment of the wetting properties of the composition.

When a copolymer made from a mixture of 55 parts of butadiene and 45 parts of acrylonitrile is employed, considerably higher proportions of rubber may be employed. Thus a mixture of roughly equal parts of rubber and of this copolymer has about the same resistance to printing inks as the compositions containing about 30 parts of rubber and 70 parts of 75-25 copolymer mentioned above.

It will be noted that the acrylonitrile constituent of the copolymer makes up approximately one-fifth of the mixture of rubber and copolymer in each of the cases just referred to.

In manufacturing the offset printing blankets of this invention, the pre-shrunk fabric base is first prepared. If a plurality of plies are employed, they are adhered together with any suitable adhesive such as a vulcanizable rubber cement.

A layer of a rubber composition which may be cured to form low-set vulcanized rubber is then formed upon this fabric. A specific suitable composition contains the following ingredients:

| | Parts by weight |
|---|---|
| Rubber | 100 |
| Sulfur | 3 |
| Accelerator | 1 |
| Carbon black | 20 |
| Zinc oxide | 5 |
| Lauric acid | 1.5 |

The accelerator may suitably be a thiazole-type material such as 2-mercaptobenzothiazole, 2-mercapto-4,5-dimethylthiazole, etc. While the above compositions may be calendered onto the pre-shrunk fabric base, a much more uniform coating is obtained by dissolving the composition in a solvent and spreading the solution upon the base. A sufficient number of coats are spread upon the base to form a structure about .015 inch thick.

The surface of the offset printing blanket is made of a composition composed of a mixture of rubber and a copolymer of butadiene and acrylonitrile. A suitable composition contains the following ingredients:

| | Parts by weight |
|---|---|
| Rubber | 30 |
| Perbunan* | 70 |
| Sulfur | 2 |
| Accelerator | 1.5 |
| Carbon black | 50 |
| Zinc oxide | 5 |
| Lauric acid | 1.5 |
| Softener for the Perbunan | 30 |

*A commercially-available synthetic rubber believed to be a copolymer of approximately 75 parts of butadiene and 25 parts of acrylonitrile.

In place of the rubber-Perbunan mixture employed above, 47 parts of rubber and 53 parts of a copolymer of a mixture of 55 parts of butadiene and 45 parts of acrylonitrile may be employed with equivalent results. The accelerator may be of the thiazole type, and any of the well known softeners for the copolymer such as butyl acetyl ricinioleate, dibutyl phthalate, dibenzyl ether, triphenyl phosphate, etc., may be employed.

It is essential that the surface layer of a mixture of rubber and copolymer adhere to the underlying layer of low-set rubber in the finished article. This may be accomplished by employing intermediate layers consisting of mixtures of the low-set rubber composition and the rubber-copolymer composition. Thus, the next coat spread on the low-set rubber may contain one-third of the rubber-copolymer composition and two-thirds of low-set rubber, the next coat may contain two-thirds of the rubber-copolymer composition and one-third of low-set rubber, and a coat of pure rubber-copolymer may be applied last. By varying the number of intermediate layers and the composition of the cements, satisfactory adhesion between any of the low-set rubber compositions and the rubber-copolymer compositions may be obtained. Other methods of adhering the rubber-copolymer composition to the low-set rubber, such as lightly chlorinating the surface of the rubber, may be employed if desired.

The mixture of rubber and copolymer need be present on the surface of the blanket in only a very thin coat such as one .002-.003 inch thick. The use of a thin layer only a few thousandths of an inch thick permits the blanket to possess the excellent mechanical properties of the low-set rubber underlayer, but still to resist printing inks much better than natural rubber.

After the blanket is constructed as described it is vulcanized. Although the preferred method of vulcanization is to cure the blanket in live steam, other methods may be employed if desired.

Although I have described a particular manner of making the offset printing blankets of this invention, similar blankets made by other methods which will occur to those skilled in the art are within the scope of the invention. It is also within the spirit and scope of the invention as defined in the appended claims to make modifications such as substituting equivalent materials and varying the proportions of materials used.

I claim:

1. An offset printing blanket comprising a low-set rubber body adhered on one side to a pre-shrunk fabric base and on the other side to a thin layer of a vulcanized mixture of rubber and a copolymer of butadiene and acrylonitrile, the copolymer being made by combining butadiene with not more than its weight of acrylonitrile, and the proportions of rubber and copolymer in the vulcanized mixture being such that the acrylonitrile constituent of the copolymer makes up approximately one-fifth of the mixture of rubber and copolymer.

2. An offset printing blanket comprising a low-set rubber body adhered on one side to a pre-shrunk fabric base and on the opposite side to a thin layer of a vulcanized mixture of rubber and a copolymer of a mixture of about 75 parts of butadiene and 25 parts of acrylonitrile, the plastic ingredients in said thin layer consisting of not more than 50% of rubber and not less than 50% of copolymer.

3. An offset printing blanket comprising a low-set rubber body adhered on one side to a pre-shrunk fabric base and on the opposite side to a thin layer of a vulcanized mixture of rubber and a copolymer of a mixture of about 75 parts of butadiene and 25 parts of acrylonitrile, the plastic ingredients in said thin layer consisting of from 20-30% of rubber and from 80-70% copolymer.

4. An offset printing blanket comprising a low-set rubber body adhered on one side to a pre-shrunk fabric base and on the opposite side to a thin layer of a vulcanized mixture of rubber and a copolymer of a mixture of about 55 parts of butadiene and 45 parts of acrylonitrile, the rubber and copolymer being present in roughly equal proportions.

ARTHUR E. JUVE.